United States Patent
Hart

[11] Patent Number: 5,806,511
[45] Date of Patent: Sep. 15, 1998

[54] METHOD AND APPARATUS TO PROVIDE FREEZE PROTECTION FOR SOLAR WATER HEATING SYSTEMS

[76] Inventor: Douglas Robinson Sanford Hart, 94 Yarmouth Road, Toronto, Ontario, Canada, M6G 1W9

[21] Appl. No.: 566,538

[22] Filed: Dec. 4, 1995

[51] Int. Cl.⁶ .................................................. F24J 2/40
[52] U.S. Cl. ................. 126/588; 165/104.21; 165/134.1
[58] Field of Search ............................ 126/588; 137/337, 137/134.1; 165/104.21, 104.19

[56] References Cited

U.S. PATENT DOCUMENTS

| | | | |
|---|---|---|---|
| 2,969,451 | 1/1961 | Logan | 137/337 |
| 4,119,087 | 10/1978 | Cook | 126/588 |
| 4,237,862 | 12/1980 | Embree | 126/588 |
| 4,246,886 | 1/1981 | Sitzlar | 126/588 |
| 4,541,412 | 9/1985 | Bagshaw et al. | 126/588 |
| 4,672,990 | 6/1987 | Robillard | 126/588 X |
| 4,930,551 | 6/1990 | Haws | 137/337 |
| 5,323,803 | 6/1994 | Blumenauer | 137/337 |
| 5,413,091 | 5/1995 | Bourke | 126/588 X |

FOREIGN PATENT DOCUMENTS 363223458  9/1988  Japan ...................................... 126/588

*Primary Examiner*—Ira S. Lazarus
*Assistant Examiner*—Christopher Atkinson

[57] ABSTRACT

A method and apparatus is described to prevent freezing in the piping and tank of a solar water heating system mounted above a heated space. The supply and return piping to the solar water heater is used in conjunction with a heat exchanger mounted within the heated space below, to create a mechanism for the gentle circulation of water by natural convection, sufficient to prevent freezing in the tank and piping. Bypass pipes that incorporate flow restrictions are introduced between the supply and return piping both in the building and just below the solar tank. This creates a loop in the piping which allows natural convection to occur. The flow restrictions are provided so as not to short circuit the normal water flow under conditions of hot water demand.

17 Claims, 1 Drawing Sheet

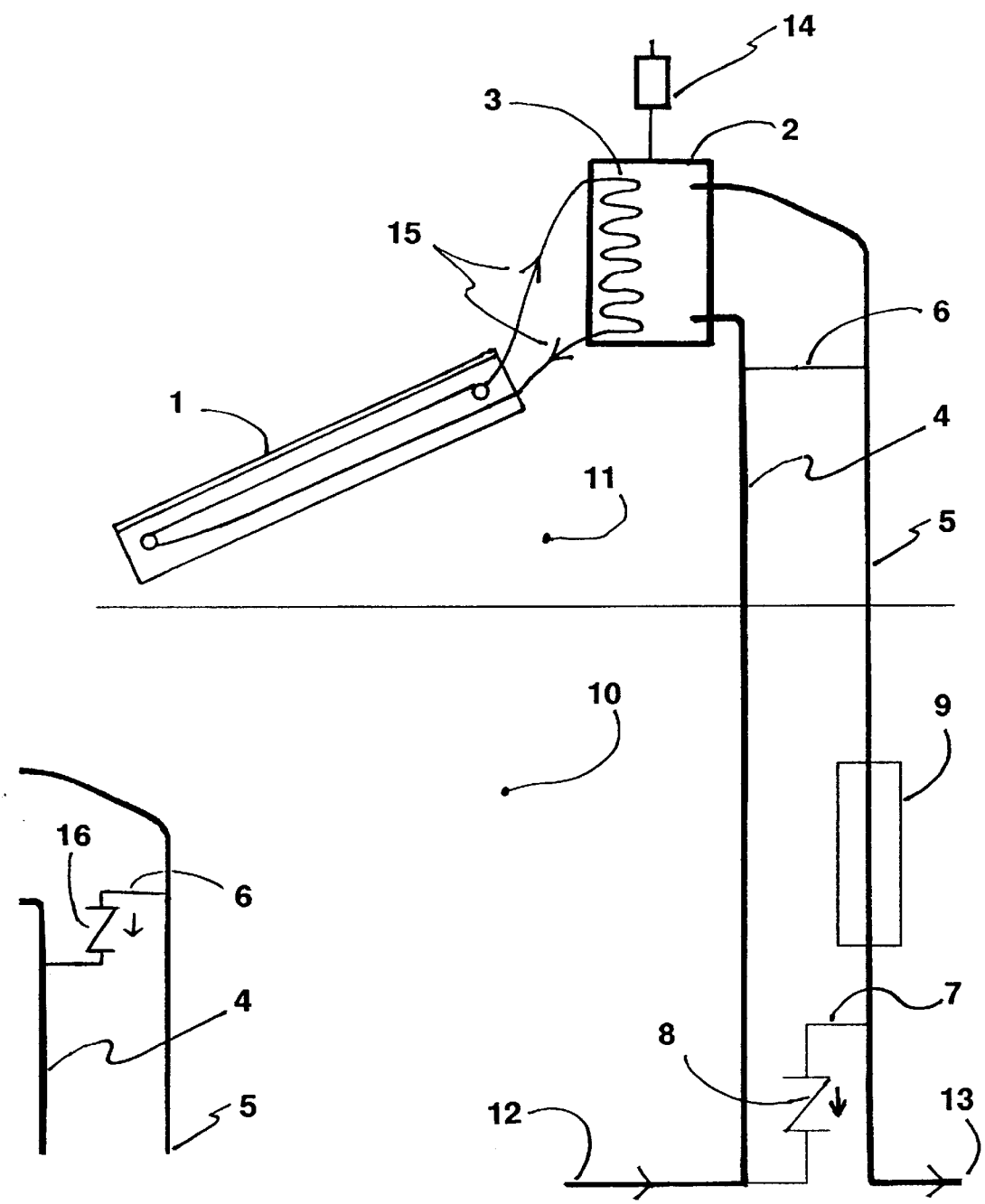

METHOD AND APPARATUS TO PROVIDE FREEZE PROTECTION FOR SOLAR WATER HEATING SYSTEMS

GENERAL DESCRIPTION

The present invention relates to the prevention of freezing in water tanks and piping when exposed to freezing conditions, and more particularly to water tanks and piping used with roof mounted solar water heaters.

In warm climates, where freezing conditions are not encountered, solar water heaters may be constructed using a very simple design, where the water tank is mounted outside, above the solar collector panel, and solar heated water circulates from the panel up to the tank by natural convection. In colder climates, however, this design is not possible, since freezing water will destroy the tank and piping, even though these may be well insulated. Instead, solar designs in freezing climates make use of freeze protection methods, such as draining the panel and piping when the system is not operating, or using antifreeze in the solar panel circuit, with a heat exchanger in the heated space to heat the domestic water. With such freeze protected systems, the solar heated water tank is usually located indoors, in the heated space.

Unfortunately, the freeze protection systems described above usually require a pump and controls, and are much more expensive to build than their warm climate counterparts, which simply use a thermosyphon system, not requiring either pump or controls. Thermosyphon systems also have other advantages, such as a variable flow rate, proportional to the rate of input solar energy, as well as enhanced stratification of the storage tank. Both of these factors tend to increase system efficiency.

The present invention provides a low cost means whereby thermosyphon type solar water heating systems can be used in freezing climates, thereby achieving significant cost and performance benefits, and making solar water heaters more cost competitive in these climates.

The present invention describes a method to protect the water tank and the supply and return piping from freezing, which operates without the use of a circulating pump or controls. This invention is fully passive, in that it is accomplished without recourse to such means a circulating pump or electric heating wires which would leave the system vulnerable in times of power failure. In the present invention, heat is transferred from the building below by natural convection through the supply and return lines leading to the solar collector.

A heat exchanger is used inside the building to absorb building heat into the solar piping, and a convection loop is created in the solar piping by introducing a bypass pipe into the system, inside the heated space.

Normally, the supply and return lines do not form a loop, but are piped in series. To allow natural convection, a loop is created by means of a bypass pipe introduced between the supply and return lines, within the heated space below the solar water heating system. In order to transfer heat to the piping, a heat exchanger is used which warms the piping passively, using heat from the building. The lighter warmed water created in the piping circulates by natural convection upward, through the solar piping where it is cooled and returns to the building below.

In some cases, a second bypass pipe is required If the solar heating system incorporates a heated water tank on the roof. In such cases, the heated water in the tank may be warmer and more buoyant than the water in the solar piping, and this would prevent natural convection from taking place. This could result in a freezing of the supply and return piping leading from the building to the tank. To alleviate this problem, an additional bypass pipe is introduced into the system just below the tank. This allows the passive circulation of water through the supply and return piping, preventing freezing. In addition, a flow restriction in this piping (such as a tubing of small diameter) prevents the significant short circuit of water through this bypass in the event of a draw of hot water from the solar tank.

DESCRIPTION OF THE DRAWING

FIG. 1 is a diagram showing one embodiment of the present invention.

FIG. 2 is a diagram showing bypass piping.

Shown in the figure is a solar panel 1, consisting of a glazing, internal piping and a solar absorber which receives solar energy and transfers this into heat in the fluid in the solar panel. The fluid used in the solar panel itself is not used in the water supply and is a separate system used only for transferring heat from the panel to the tank 2 mounted above. This fluid may be protected from freezing by the use of an antifreeze solution, such as propylene glycol. The heat from the solar panel fluid is transferred to the water in the tank by means of a tank heat exchanger 3. The fluid in the solar panel circulates from the panel to the heat exchanger by natural convection. The arrows 15 indicate the direction of flow of this natural convection.

Water from the building water supply is piped to and from the tank 2 by means of a cold water supply pipe 4 and a hot water return pipe 5, both of which pass from inside the building out to the solar tank. The solar heated water may then be used, either directly in the building, or as preheated water for the backup water heater. Although not shown in the figure, both the back of the solar panel 1, the tank 2, and the supply and return piping 4 & 5 are typically well insulated.

This piping 4 & 5 and the tank 2 may be exposed to freezing outside conditions 11 and contain only water from the building below 10. Note that the entire system is connected to the building cold water supply 12 and typically to the building hot water tank inlet via the pipe 13.

The supply and return piping 4 & 5 to the tank 2 is provided with both an upper bypass 6 and a lower bypass 7 to provide for a convection loop around the piping system. The upper bypass 6 is simply a section of small diameter piping which connects the cold supply piping 4 to the hot return piping 5, immediately below the solar tank 2. The lower bypass 7 also connects the hot and cold piping, but inside the heated space. In addition, the lower bypass is provided with a check valve 8 mounted in such a way that in the event that there is a demand for hot water, the flow of water through the piping will cause the check valve to close, and thus be diverted through the solar water heater. The arrow shown in FIG. 1 adjacent to the check valve 8 indicates the permitted direction of flow through the check valve. However, when there is no hot water demand in the building, the check valve falls open by gravity, allowing an open passageway for water to flow under the more gentle forces of natural convection. The natural convection forces are not sufficient to cause the check valve to close.

Also provided in this figure is a building heat exchanger 9 which allows natural heat transfer between the air in the heated space and the water in the piping. Heat transferred through this heat exchanger is responsible for creating a circulation of water by natural convection through the solar piping. This circulation allows water that is warmed by the building heat exchanger 9 to circulate out to the tank 2 and the solar piping 4 & 5, thereby preventing the tank and piping from freezing.

The reason for the upper bypass 6, below the solar tank 2 is to protect the piping in the event that the solar tank contains heated water. In this situation, the lighter heated water in the tank 2 above may not circulate down, since it may be lighter than the water heated from below by the building, by the heat exchanger 9. In this way, in the absence of the bypass 6, the hot water in the tank 2 could form a block to convection, with the result that the water in the supply and return piping 4 & 5 may freeze. On the other hand, if the tank water is not heated, the natural convection will continue from the building heat exchanger 9 up into the tank 2, thereby protecting it from freezing as well.

It is advisable that the solar piping 4 & 5, as well as the piping between the collector and tank have a continuous upward slope, to assist with the convection process, and to prevent the formation of bubbles or air locks which could prevent convection from occurring. The solar tank 2 is provided with an air vent 14 to allow the escape of accumulated air bubbles in the tank itself. The antifreeze piping loop including the piping in the solar panel 1 and up to and including the heat exchanger 3 must also include a small expansion tank (not shown) to allow for thermal expansion and contraction of the fluid in this closed loop.

Note that in the embodiment shown in FIG. 1. of the drawings, the upper bypass 6 is formed of small diameter piping, sufficient to provide natural convection, but small enough so that during a normal demand for hot water, only a small amount of the water flow (in the range of 10%) is diverted through the bypass.

The solar tank 2 and the piping 4 & 5 must be adequately insulated and the building heat exchanger 9 adequately sized so as to provide a good safety margin for heat transfer and freeze protection. This insulation is not shown in FIG. 1.

It is also contemplated that alternate arrangements may be made other than those described in the drawing, to provide the required natural convection. For example, in FIG. 2 the upper bypass pipe 6 contains a check valve 16, to divert the bulk of the normal hot water flow on demand through the solar tank, but to still allow natural convection flow to occur in cases where there is little or no hot normal water demand.

While one embodiment of this invention has been described in the accompanying drawing and described hereinabove, it will be evident to those skilled in the art that changes and modifications may be made therein, without departing from the essence of this invention.

The embodiments of the invention in which an exclusive property or privilege is claimed are defined as follows:

1. For an arrangement which includes a heated space, an unheated space generally above said heated space, and water conducting means which includes a double piping arrangement extending from the heated space to the unheated space, the improvement comprising:
   a bypass pipe linking the double piping arrangement within the heated space thus forming a natural convection loop which includes at least part of the double piping arrangement and said bypass pipe,
   a heat source for transferring heat to said natural convection loop above the bypass pipe, thereby to promote natural convective flow within the loop,
   and a flow restriction means in the bypass pipe such that the major portion of normal water flow through the double piping arrangement is prevented from flowing through the bypass pipe.

2. The improvement claimed in claim 1, in which the flow restriction means consists of a check valve mounted in such a way that when the normal flow of water through the piping arrangement is small or negligible, the check valve falls open, so as to allow convective flow in the double piping arrangement.

3. The improvement claimed in claim 1, in which the heat source is a heat exchanger which allows natural convection heat transfer between the air in the heated space and the water in the convection loop.

4. The improvement claimed in claim 1 in which said water conducting means within the unheated space contains a heated component within it which by the heating of water in this component creates a barrier to convective flow in the natural convection loop, the improvement consisting of the following additional steps:
   the addition of a second bypass pipe linking the double piping arrangement immediately below the heated component in the unheated space, so as to create a smaller natural convection loop within the double piping arrangement below,
   and the addition of a flow restriction means within said second bypass pipe whereby the majority of the normal flow of water through the double piping arrangement is not directed through said second bypass pipe.

5. The improvement claimed in claim 4, in which the flow restriction means within the second bypass pipe consists of a check valve mounted in such a way that when the normal flow of water through the piping arrangement is small or negligible, the check valve falls open, so as to allow convective flow in the piping arrangement below.

6. The improvement claimed in claim 4, in which said flow restriction means within the second bypass pipe consists of a section of piping of smaller diameter than that of the double piping arrangement, so as to divert only a small part of the normal flow of water, while still permitting natural convective flow to occur in the double piping arrangement below.

7. The improvement claimed in claim 4, in which the double piping arrangement is the supply and return piping for a solar water heating system, and the heated component within the unheated space is a solar water heating system.

8. The improvement claimed in claim 4, in which the double piping arrangement is the supply and return piping for a solar water heating system, and the heated component within the unheated space is a thermal storage tank of a thermosyphon type solar water heating system.

9. For an arrangement which includes a heated space, an unheated space generally above said heated space, and water conducting means which includes a double piping arrangement extending from the heated space to the unheated space, a method of preventing the freezing of water in that part of the water conducting means located in the unheated space, the method comprising the steps:
   linking the double piping arrangement within the heated space with a bypass pipe, thus forming a natural convection loop which includes at least part of the double piping arrangement and said bypass pipe,
   transferring heat to said natural convection loop above the bypass pipe, thereby to promote natural convective flow within the loop,
   and restricting the flow of water through the bypass pipe such that the major portion of normal water flow through the double piping arrangement is prevented from flowing through the bypass pipe.

10. The method claimed in claim 9, in which restricting the flow in the bypass pipe is accomplished by installing a check valve in the bypass pipe, in such a way that when the normal flow of water through the piping arrangement is small or negligible, the check valve falls open, to allow convective flow in the double piping arrangement.

11. The method claimed in claim 9, in which transferring heat to the convection loop is accomplished by installing a heat exchanger to allow natural convection heat transfer between the air in the heated space and the water in the convection loop.

12. For the method claimed in claim 9, in which said water conducting means within the unheated space contains a heated component within it which by the heating of water in this component creates a barrier to convective flow in the natural convection loop, a method of preventing the freezing of water in that part of the water conducting means located in the unheated space, the method comprising the steps:

linking the double piping arrangement immediately below the heated component in the unheated space with a second bypass pipe, so as to create a smaller natural convection loop within the double piping arrangement below, and restricting the flow within said second bypass pipe whereby the majority of the normal flow of water through the double piping arrangement is not directed through the second bypass pipe.

13. The method claimed in claim 12 in which restricting the flow in the second bypass pipe is accomplished by installing a check valve mounted in such a way that when the normal flow of water through the piping arrangement is small or negligible, the check valve falls open, so as to allow convective flow within the piping arrangement below.

14. The improvement claimed in claim 12, in which restricting the flow in the second bypass pipe is accomplished by installing a section of piping of smaller diameter than that of the double piping arrangement, so as to divert only a small part of the normal flow of water, while still permitting natural convective flow to occur in the double piping arrangement below.

15. The method claimed in claim 12 in which the double piping arrangement is the supply and return piping for a solar water heating system, and the heated component within the unheated space is a solar water heating system.

16. The method claimed in claim 12 in which the double piping arrangement is the supply and return piping for a solar water heating system and the heated component within the unheated space is a thermal storage tank of a thermo-syphon type solar water heating system.

17. A system comprising:

a heated space, an unheated space generally above said heated space, water conducting means which includes two pipes both extending from the heated space to the unheated space and being in fluid communication with each other above the heated space, a bypass circuit linking the two pipes within the heated space, thus forming a convection loop which includes at least portions of the two pipes, a heat source for transferring heat to the convection loop thereby to promote convective flow within the loop, and flow restriction means in the bypass conduit such that the major portion of normal water flow through the system is prevented from flowing through the bypass circuit.

\* \* \* \* \*